(12) United States Patent
Takahashi et al.

(10) Patent No.: US 8,845,468 B2
(45) Date of Patent: Sep. 30, 2014

(54) FRICTION DRIVE BELT AND BELT TRANSMISSION SYSTEM USING THE SAME

(75) Inventors: Shinji Takahashi, Kobe (JP); Hisashi Matsuda, Kobe (JP)

(73) Assignee: Bando Chemical Industries, Ltd., Kobe-Shi, Hyogo (JP)

( * ) Notice: Subject to any disclaimer, the term of this patent is extended or adjusted under 35 U.S.C. 154(b) by 824 days.

(21) Appl. No.: 12/997,249

(22) PCT Filed: Jun. 4, 2009

(86) PCT No.: PCT/JP2009/002523
§ 371 (c)(1),
(2), (4) Date: Dec. 9, 2010

(87) PCT Pub. No.: WO2009/150803
PCT Pub. Date: Dec. 17, 2009

(65) Prior Publication Data
US 2011/0086735 A1     Apr. 14, 2011

(30) Foreign Application Priority Data

Jun. 12, 2008 (JP) .................................. 2008-153899

(51) Int. Cl.
| | |
|---|---|
| F16H 7/02 | (2006.01) |
| C08K 3/04 | (2006.01) |
| F16G 1/10 | (2006.01) |
| F16G 5/20 | (2006.01) |
| F16G 5/06 | (2006.01) |
| C08L 23/08 | (2006.01) |
| C08L 77/00 | (2006.01) |

(52) U.S. Cl.
CPC ............... *F16G 5/06* (2013.01); *C08L 2205/16* (2013.01); *C08L 77/00* (2013.01); *C08K 3/04* (2013.01); *F16G 5/20* (2013.01); *C08L 23/0815* (2013.01)
USPC ......................................................... 474/148

(58) Field of Classification Search
None
See application file for complete search history.

(56) References Cited

U.S. PATENT DOCUMENTS

| | | | | |
|---|---|---|---|---|
| 6,758,779 | B2 * | 7/2004 | Fujimoto | 474/260 |
| 6,866,922 | B2 * | 3/2005 | Takehara et al. | 428/295.1 |
| 7,485,060 | B2 * | 2/2009 | Hineno et al. | 474/263 |
| 2001/0034282 | A1 * | 10/2001 | Hasaka et al. | 474/260 |
| 2003/0032514 | A1 * | 2/2003 | Edwards et al. | 474/263 |
| 2005/0031825 | A1 * | 2/2005 | Allen et al. | 428/57 |
| 2010/0203994 | A1 * | 8/2010 | Fujikawa et al. | 474/263 |
| 2011/0028257 | A1 * | 2/2011 | Sealey et al. | 474/263 |

FOREIGN PATENT DOCUMENTS

| | | |
|---|---|---|
| JP | 2001-165244 A | 6/2001 |
| JP | 2003-202055 A | 7/2003 |

(Continued)

OTHER PUBLICATIONS

International Search Report for PCT/JP2009/002523 mailed Jun. 30, 2009.

*Primary Examiner* — William E Dondero
*Assistant Examiner* — Mark K Buse
(74) *Attorney, Agent, or Firm* — Roberts Mlotkowski Safran & Cole P.C.

(57) ABSTRACT

A friction drive belt (B) includes a pulley contacting portion (13) which is made of a rubber composition of an ethylene-α-olefin elastomer as raw rubber in which carbon black having an iodine adsorption number of 40 mg/g or lower, and 3-10 parts by mass of short aramid fiber (14) relative to 100 parts by mass of the raw rubber are blended.

2 Claims, 4 Drawing Sheets

(56) References Cited

FOREIGN PATENT DOCUMENTS

| JP | 2004-125012 A | 4/2004 |
| JP | 2005-188689 A | 7/2005 |
| JP | 2006-316812 A | 11/2006 |
| JP | 2007-198468 A | 8/2007 |

* cited by examiner

FRICTION DRIVE BELT AND BELT TRANSMISSION SYSTEM USING THE SAME

TECHNICAL FIELD

The present invention relates to a friction drive belt, and a belt transmission system using the same.

BACKGROUND ART

A plurality of pulleys and a V-ribbed belt wrapped around the pulleys have widely been used as an accessory drive belt transmission system provided in an engine compartment of an automobile.

In such an accessory drive belt transmission system, when the automobile is running in rain, and water that entered the engine compartment comes between the V-ribbed belt and the pulley, the V-ribbed belt easily slips on the pulley, thereby generating slip sound. Various solutions to this problem have been proposed.

Patent Document 1 teaches a V-ribbed belt having a compression rubber layer made of a rubber composition prepared by blending 1-15 parts by mass of very short fiber having a length of 0.1-1.0 mm, and a moisture content of 6-20% relative to 100 parts by mass of rubber. This alleviates the slip of the belt even when water is present, and keeps the anti-slip effect continuously.

Patent Document 2 teaches a V-ribbed belt having a ribbed portion which contains at least short cotton fiber, and intermediate short fiber having an intermediate elastic modulus between an elastic modulus of rubber primarily constituting the ribbed portion, and an elastic modulus of the short cotton fiber. With this configuration, the short cotton fiber absorbs water on the belt, and a coefficient of friction smoothly changes as the wet belt dries. Further, the intermediate short fiber having the intermediate elastic modulus between the elastic modulus of the rubber and the elastic modulus of the short cotton fiber can prevent abrupt stick-slip friction, thereby preventing repeated slip and stick, and alleviating generation of noise.

Patent Document 3 teaches a V-ribbed belt in which a compression rubber layer is made of a rubber composition containing rubber, and 5-60 parts by weight (pbw) of hollow short fiber relative to 100 pbw of the rubber. This alleviates reduction in transmission performance when the belt is wet, and provides the V-ribbed belt with high resistance to wear, and high endurance.

CITATION LIST

Patent Documents

[Patent Document 1] Japanese Patent Publication No. 2004-125012
[Patent Document 2] Japanese Patent Publication No. 2003-202055
[Patent Document 3] Japanese Patent Publication No. 2007-198468

SUMMARY OF THE INVENTION

Technical Problem

In the field of automobiles, size reduction of the engine compartment has been in demand, and reduction in diameter of the pulleys of the accessory drive belt transmission system has been pursued. Even when the pulleys are reduced in diameter, low noise has inevitably been required. In particular, there has been great demand to alleviate the generation of noise when the belt is wet.

An object of the invention is to provide a friction drive belt capable of alleviating the generation of noise when the belt wrapped around small-diameter pulleys is wet, and a belt transmission system using the friction drive belt.

Solution to the Problem

A friction drive belt of the present invention includes a pulley contacting portion which is made of a rubber composition of an ethylene-α-olefin elastomer as raw rubber in which carbon black having an iodine adsorption number of 40 mg/g or lower, and 3-10 parts by mass of short aramid fiber relative to 100 parts by mass of the raw rubber are blended.

A belt transmission device of the present invention includes the friction drive belt which is wrapped around a plurality of pulleys including a pulley having a diameter of 70 mm or smaller.

Advantages of the Invention

According to the present invention, the pulley contacting portion is made of the rubber composition of the ethylene-α-olefin elastomer as the raw rubber in which the carbon black having an iodine adsorption number of 40 mg/g or lower, and 3-10 parts by mass of the short aramid fiber relative to 100 parts by mass of the raw rubber are blended. Therefore, even when the belt is wrapped around small-diameter pulleys, the generation of noise when the belt is wet can be alleviated.

BRIEF DESCRIPTION OF THE DRAWINGS

FIGS. 2(*a*) and 2(*b*) show a method for fabricating the V-ribbed belt.

DESCRIPTION OF EMBODIMENT

An embodiment will be described in detail with reference to the drawings.

Figure 1:
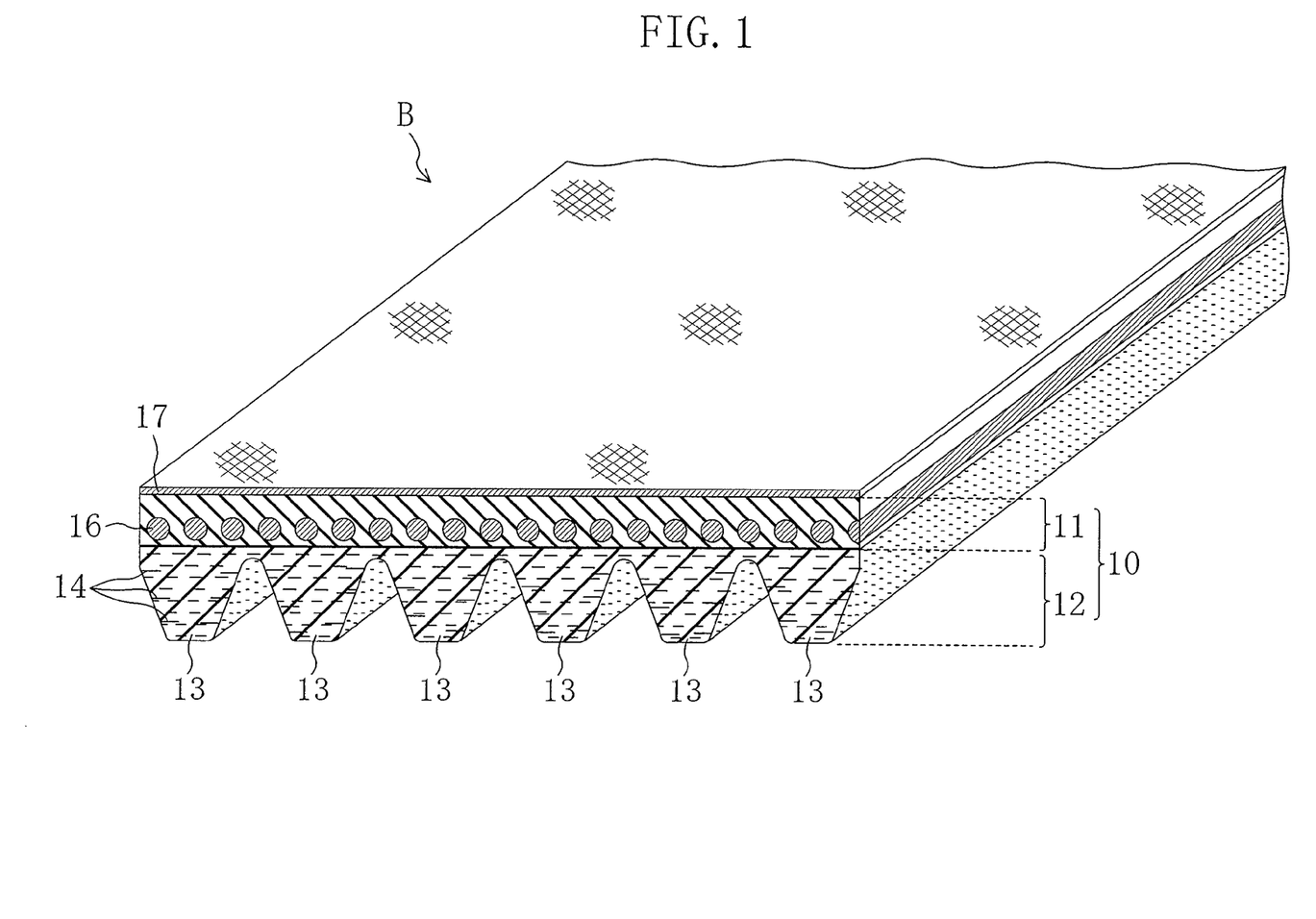
FIG. 1 is a perspective view of a V-ribbed belt.

FIG. 1 shows a V-ribbed belt B of the present embodiment. The V-ribbed belt B is used, for example, in an accessory drive belt transmission system placed in an engine compartment of an automobile.

The V-ribbed belt B includes a double-layer V-ribbed belt body 10 including an adhesion rubber layer 11 constituting an outer surface of the belt, and a compression rubber layer 12 constituting an inner surface of the belt. A reinforcement fabric 17 is adhered to the outer surface of the V-ribbed belt body 10. Core wire 16 arranged at a certain pitch in a lateral direction of the belt is embedded in the adhesion rubber layer 11. The V-ribbed belt B has a length of 700-3000 mm, a width of 10-36 mm, and a thickness of 4.0-5.0 mm.

The adhesion rubber layer 11 is in the shape of a strip having an oblong cross section, and has a thickness of 1.0-2.5 mm, for example. The adhesion rubber layer 11 is made of a rubber composition containing raw rubber, and various ingredients blended therein. Examples of the rubber composition constituting the adhesion rubber layer 11 include, for example, an ethylene-α-olefin elastomer such as ethylene-propylene rubber (EPR), ethylene-propylene-diene monomer rubber (EPDM), etc., chloroprene rubber (CR), chlorosulfonated polyethylene rubber (CSM), hydrogenated acrylonitrile-butadiene rubber (H-NBR), etc. Among them, the ethylene-α-olefin elastomer is preferable in terms of environmental friendliness, resistance to wear, resistance to cracking, etc. Examples of the ingredients include, for example, crosslinkers, crosslinking promoters, crosslinking aids, plasticizers, processing oils, antioxidants, reinforcing agents such as carbon black, short fibers, etc., and fillers. The rubber composition constituting the adhesion rubber layer 11 is produced by heating and pressing an uncrosslinked rubber composition prepared by kneading the raw rubber blended with the ingredients, and crosslinking the kneaded product by a crosslinker.

The compression rubber layer 12 includes a plurality of V-shaped ribs 13 protruding from the inner surface of the belt. The plurality of V-shaped ribs 13 constitute a pulley contacting portion. Each of the V-shaped ribs 13 is in the shape of a rib extending in the longitudinal direction of the belt, and having a substantially inverted triangular cross-section. The V-shaped ribs 13 are aligned in the lateral direction of the belt. Each of the V-shaped ribs 13 has, for example, a height of 2.0-3.0 mm, and a width of 1.0-3.6 mm at a proximal end thereof. For example, the belt includes 3-6 ribs (6 ribs in FIG. 1).

The compression rubber layer 12 is made of a rubber composition of an ethylene-α-olefin elastomer, such as ethylene-propylene rubber (EPR), ethylene-propylene-diene monomer rubber (EPDM), etc. as raw rubber, and various ingredients blended therein. The rubber composition constituting the compression rubber layer 12 is produced by heating and pressing an uncrosslinked rubber composition prepared by kneading the raw rubber blended with the ingredients, and crosslinking the kneaded product by a crosslinker.

Examples of the ingredients blended in the rubber composition constituting the compression rubber layer 12 essentially include large particle carbon black, and short aramid fiber 14, and further include, for example, crosslinkers, crosslinking promoters, crosslinking aids, plasticizers, processing oils, antioxidants, fillers, etc.

The large particle carbon black is carbon black having an iodine adsorption number of 40 mg/g or lower. Examples of the large particle carbon black include, for example, carbon black GPF (iodine adsorption number: 26 mg/g), carbon black SRF-HS (iodine adsorption number: 30 mg/g), carbon black SRF-HS (iodine adsorption number: 24 mg/g), carbon black SRF (iodine adsorption number: 26 mg/g), carbon black SRF-LS (iodine adsorption number: 21 mg/g), FT carbon black (iodine adsorption number: 18 mg/g), etc. The large particle carbon black is preferably blended in an amount of 10-80 parts by mass, more preferably 40-60 parts by mass, relative to 100 parts by mass of the raw rubber. The large particle carbon black may be made of a single material, or two or more materials. The rubber composition of the compression rubber layer 12 may contain carbon black except for the large particle carbon black.

Examples of the short aramid fiber 14 include para-short aramid fiber, and meta-short aramid fiber. The short aramid fiber 14 is blended in an amount of 3-10 parts by mass, preferably 4-7 parts by mass, more preferably 5-6 parts by mass, relative to 100 parts by mass of the raw rubber. The short aramid fiber 14 has a length of 1-3 mm, and a diameter of 8-20 μm, for example. The short aramid fiber 14 is manufactured by, for example, cutting long fiber which is immersed in an aqueous solution of resorcin/formalin/latex (hereinafter referred to as an RFL aqueous solution), and heated for adhesion treatment, into a predetermined length in the longitudinal direction of the long fiber. The short aramid fiber 14 is oriented, for example, in the lateral direction of the belt. The short aramid fiber 14 may partially be exposed on the surface of the pulley contacting portion, i.e., on the surfaces of the V-shaped ribs 13. The short aramid fiber 14 exposed on the surfaces of the V-shaped ribs 13 may protrude from the surfaces of the V-shaped ribs 13. The rubber composition constituting the compression rubber layer 12 may contain short fiber except for the short aramid fiber 14.

The crosslinker may be, for example, sulfur, organic peroxide, etc. Organic peroxide is preferably used as the crosslinker in terms of resistance to heat and oil. Examples of organic peroxide include, for example, dicumyl peroxide, 1,3-bis(t-butylperoxyisopropyl)benzene, 2,5-dimethyl-2,5-di(t-butylperoxy)hexane, etc. The amount of organic peroxide is, for example, 2-15 parts by mass relative to 100 parts by mass of the raw rubber.

Examples of the crosslinking promoter include thiazole-based promoters, thiuram-based promoters, etc. The crosslinking promoter may be made of a single material, or two or more of materials.

Examples of the crosslinking aid include zinc oxide, magnesium oxide, stearic acid, etc. The crosslinking aid may be made of a single material, or two or more materials.

Examples of the plasticizer include dialkyl phthalate, dialkyl adipate, dialkyl sebacate, etc. The plasticizer may be made of a single material, or two or more materials.

Examples of the processing oil include paraffinic oil, naphthenic oil, aromatic oil, etc. The processing oil may be made of a single material, or two or more materials.

Examples of the antioxidant include, for example, an amine-based antioxidant, a phenol-based antioxidant, etc. The antioxidant may be made of a single material, or two or more materials.

Examples of the filler include, for example, calcium carbonate, clay, talc, diatomaceous earth, etc. The filler may be made of a single material, or two or more materials.

The adhesion rubber layer 11 and the compression rubber layer 12 may be made of different rubber compositions, or the same rubber composition.

The core wire 16 is made of twisted yarn 16' of polyester (PET) fiber, polyethylene naphthalate (PEN) fiber, aramid fiber, vinylon fiber, etc. To provide the core wire 16 with an adhesion property to the V-ribbed belt body 10, adhesion treatment has been performed on the core wire material before forming into the core wire, by immersing the core wire material in the RFL aqueous solution, and heating the immersed core wire material, and/or immersing the core wire material in rubber cement, and drying the immersed core wire material.

The reinforcement fabric 17 may be, for example, woven fabric 17' which is plain-, twill-, or satin-woven fabric of cotton, polyamide fiber, polyester fiber, aramid fiber, etc. To provide the reinforcement fabric 17 with an adhesion property to the V-ribbed belt body 10, adhesion treatment has been performed on the reinforcement fabric 17 before cutting, by immersing the fabric into the RFL aqueous solution, and heating the immersed fabric, and/or coating a surface of the fabric facing the V-ribbed belt body 10 with rubber cement, and drying the rubber cement. The reinforcement fabric 17 may be knit fabric.

Instead of the reinforcement fabric 17, the rubber composition may constitute the outer surface of the belt. In this case, a back rubber layer is shaped into a strip having an oblong cross-section, and a thickness of 0.3-1.0 mm. The back rubber layer is made of a rubber composition containing raw rubber and various ingredients blended therein. Examples of the raw rubber contained in the rubber composition constituting the back rubber layer include, for example, an ethylene-α-olefin elastomer such as ethylene-propylene rubber (EPR), ethylene-propylene-diene monomer rubber (EPDM), etc., chloroprene rubber (CR), chlorosulfonated polyethylene rubber (CSM), hydrogenated acrylonitrile-butadiene rubber (H-NBR), etc. Among them, the ethylene-α-olefin elastomer rubber is preferable in terms of environmental friendliness, resistance to wear, and resistance to cracking. Examples of the ingredients include, for example, crosslinkers, crosslinking promoters, crosslinking aids, plasticizers, processing oils, antioxidants, reinforcing agents such as carbon black, and short fiber, etc., and fillers. The rubber composition constituting the back rubber layer is produced by heating and pressing an uncrosslinked rubber composition prepared by kneading the raw rubber blended with the ingredients, and crosslinking the kneaded product by a crosslinker.

Figure 2:
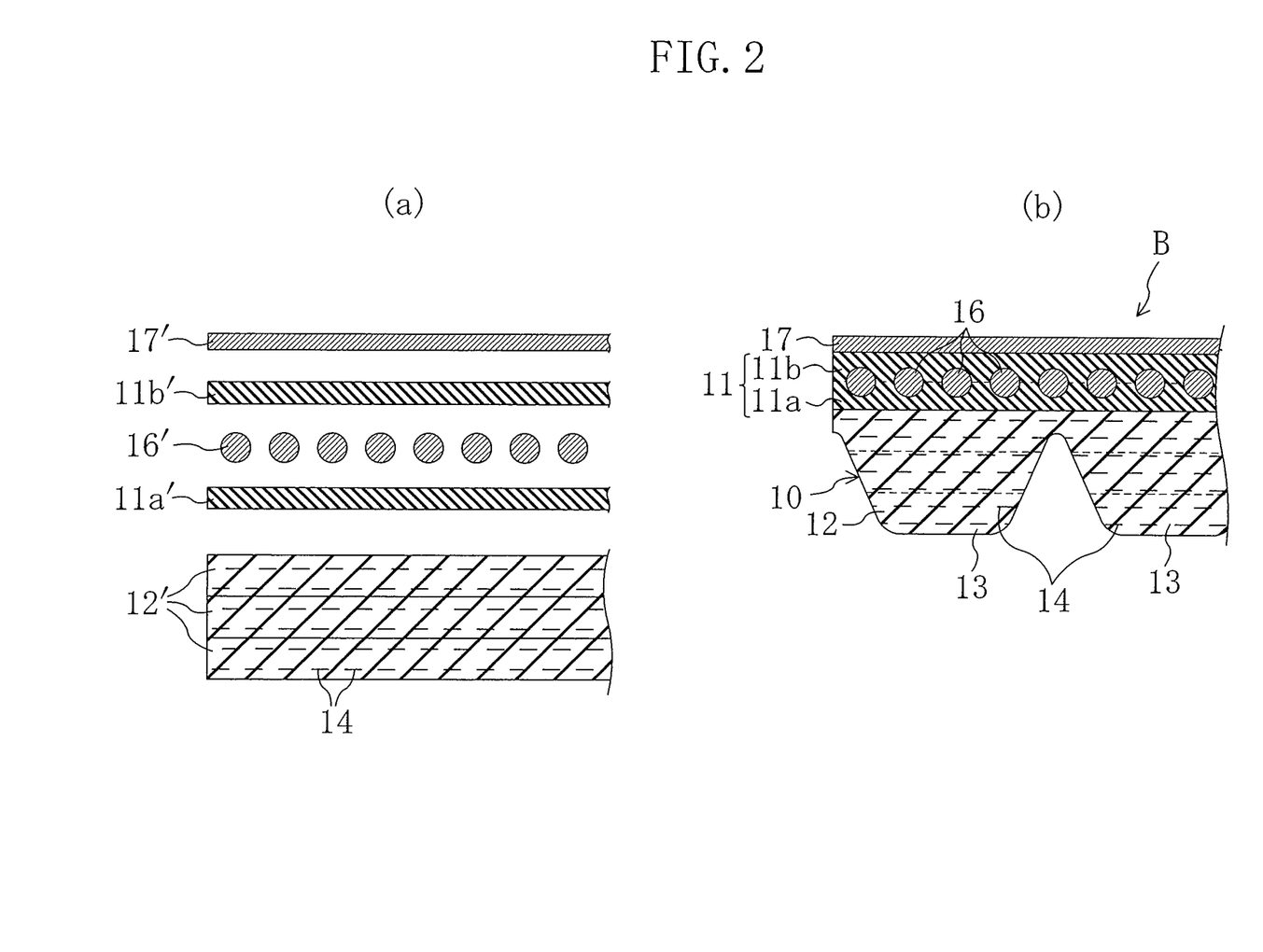

A method for manufacturing the V-ribbed belt B will be described with reference to FIG. 2.

In the manufacture of the V-ribbed belt B, an inner mold having a molding surface on an outer circumference thereof for forming a predetermined shape of the outer surface of the belt, and a rubber sleeve having a molding surface on an inner circumference thereof for forming a predetermined shape of the inner surface of the belt are used.

First, the outer circumference of the inner mold is covered with woven fabric 17' constituting the reinforcement fabric 17, and an uncrosslinked rubber sheet 11b' for forming an outer part 11b of the adhesion rubber layer 11 is wrapped around the woven fabric.

Then, twisted yarn 16' constituting the core wire 16 is helically coiled around the adhesion rubber layer 11, and an uncrosslinked rubber sheet 11a' for forming an inner part 11a of the adhesion rubber layer 11 is wrapped around the twisted yarn. Then, an uncrosslinked rubber sheet 12' for forming the compression rubber layer 12 is wrapped around the uncrosslinked rubber sheet 11a'. In the uncrosslinked rubber sheet 12' constituting the compression rubber layer 12, the short aramid fiber 14 is oriented in a direction orthogonal to the wrapping direction. The uncrosslinked rubber sheet 12' contains large particle carbon black having an iodine adsorption number of 40 mg/g or lower, and 3-10 parts by mass of the short aramid fiber 14 relative to 100 parts by mass of the raw rubber.

Then, the rubber sleeve is put on the obtained product provided on the inner mold, and the rubber sleeve and the inner mold are placed in a molding furnace to heat the inner mold with high temperature water vapor etc., and to press the rubber sleeve radially inward with high pressure. At this time, the rubber component flows, and a crosslinking reaction proceeds. Simultaneously, the twisted yarn 16' and the woven fabric 17' are reacted to adhere to the rubber. Thus, a tubular belt slab (a base of the belt body) is obtained.

The belt slab is removed from the inner mold, and is divided into several pieces in the longitudinal direction. Then, an outer circumference of each piece is cut and polished to form the V-shaped ribs 13, i.e., the pulley contacting portion. The short aramid fiber 14 exposed on the surface of the pulley contacting portion may protrude from the surface of the pulley contacting portion, i.e., the surfaces of the V-shaped ribs 13.

Then, the divided belt slab pieces on each outer circumference thereof the V-shaped ribs 13 are formed is cut to have a predetermined width. The pieces are turned inside out, thereby obtaining the V-ribbed belt B.

An accessory drive belt transmission system 30 of an automobile using the V-ribbed belt B will be described below.

Figure 3:
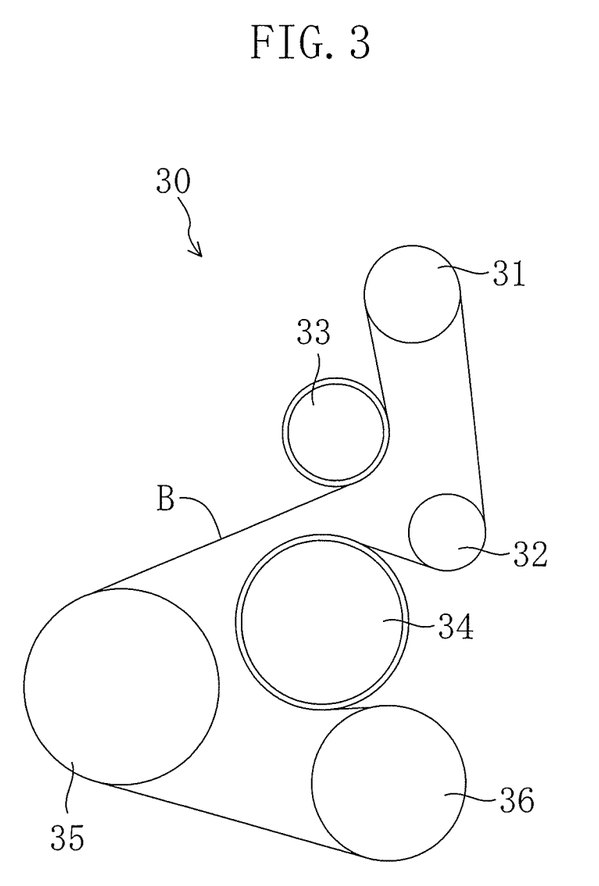
FIG. 3 shows a layout of pulleys of an accessory drive belt transmission system.

FIG. 3 shows a layout of pulleys of the accessory drive belt transmission system 30. The accessory drive belt transmission system 30 is a serpentine drive system, and includes the V-ribbed belt B wrapped around 6 pulleys including 4 ribbed pulleys and 2 flat pulleys.

The layout of the accessory drive belt transmission system 30 includes a power steering pulley 31 provided at the topmost position, an alternator pulley 32 provided below the power steering pulley 31, a flat tensioner pulley 33 provided at a lower left position relative to the power steering pulley 31, a flat water pump pulley 34 provided below the tensioner pulley 33, a crankshaft pulley 35 provided at a lower left position relative to the tensioner pulley 33, and an AC pulley 36 provided at a lower right position relative to the crankshaft pulley 35. The pulleys except for the flat tensioner pulley 33 and the flat water pump pulley 34 are all ribbed pulleys. The V-ribbed belt B is sequentially wrapped around the power steering pulley 31 with the V-shaped ribs 13 in contact with the power steering pulley 31, the tensioner pulley 33 with the back surface of the belt in contact with the tensioner pulley 33, and the crankshaft pulley 35 and the AC pulley 36 with the V-shaped ribs 13 in contact with the crankshaft pulley 35 and the AC pulley 36. The V-ribbed belt B is further wrapped around the water pump pulley 34 with the back surface of the belt in contact with the water pump pulley 34, is wrapped around the alternator pulley 32 with the V-shaped ribs 13 in contact with the alternator pulley 32, and is returned to the power steering pulley 31.

Diameters of the four ribbed pulleys will be described. For example, the power steering pulley 31 has a diameter of 80-120 mm, the alternator pulley 32 has the smallest diameter of 50-70 mm, the crankshaft pulley 35 has the largest diameter of 150-170 mm, and the AC pulley 36 has a diameter of 120-140 mm. The diameter of each of the four ribbed pulleys includes the height of the ribs.

The two flat pulleys, i.e., the tensioner pulley 33 and the water pump pulley 34, have diameters of 70-100 mm, and 140-160 mm, respectively.

In the V-ribbed belt of the present embodiment, the V-shaped ribs 13 constituting the pulley contacting portion are made of the rubber composition of the ethylene-α-olefin elastomer as the raw rubber in which carbon black having an iodine adsorption number of 40 mg/g or lower, and 3-10 parts by mass of the short aramid fiber 14 relative to 100 parts by mass of the raw rubber are blended. Therefore, for example, even when the V-ribbed belt is wrapped around the small-diameter alternator pulley having a diameter of 50-70 mm in the accessory drive belt transmission system 30, generation of noise when the belt is wet can be alleviated.

In the present embodiment, the V-ribbed belt B has been described. However, the invention is not limited to the V-ribbed belt, and may be applied to the other friction drive belts such as V-belts, double V-ribbed belts, flat belts, cogged belts, etc.

[Evaluation Test]

An evaluation test performed on the V-ribbed belt will be described below.

(Test Belt)

The following rubber compositions 1-12 were prepared, and the V-ribbed belts of Examples 1-5 and Comparative Examples 1-5 were formed using the rubber compositions. Their compositions are shown in Tables 1 and 2.

<Rubber Composition 1>

In EPDM (manufactured by Sumitomo Chemical Co., Ltd., trade name: ESPRENE 301) as raw rubber, 60 parts by mass of carbon black GPF (manufactured by Mitsubishi Chemical Corporation, trade name: DIA-G, iodine adsorption number: 24 mg/g), 10 parts by mass of carbon black FEF (manufactured by Tokai Carbon Co., Ltd., trade name: SEAST SO, iodine adsorption number: 44 mg/g), 5 parts by mass of zinc oxide (manufactured by Sakai Chemical Industry Co., Ltd., trade name: zinc oxide type III), 0.5 parts by mass of an antioxidant (1) (manufactured by Ouchi Shinko Chemical Industrial Co., Ltd., trade name: NOCRAC 224), 2 parts by mass of an antioxidant (2) (manufactured by Ouchi Shinko Chemical Industrial Co., Ltd., trade name: NOCRAC MB), 10 parts by mass of paraffinic oil (manufactured by Japan Sun Oil Company, Ltd., trade name: SUMPAR 2280), 1 part by mass of a co-crosslinker (manufactured by Seiko Chemical Co., Ltd., trade name: Hi-Cross M), 4.5 parts by mass of dicumyl peroxide (manufactured by NOF CORPORATION, trade name: PERCUMYL D), and 5 parts by mass of short aramid fiber (manufactured by Teijin Limited, trade name: Conex, length: 3 mm), relative to 100 parts by mass of the raw rubber, were blended, and the blend was kneaded in an internal kneader for 5 minutes to obtain an uncrosslinked rubber composition. The uncrosslinked rubber composition was shaped into a sheet. The uncrosslinked rubber composition was referred to as Rubber composition 1.

<Rubber Composition 2>

The same uncrosslinked rubber composition as Rubber composition 1 was prepared except that the content of the short aramid fiber was changed to 10 parts by mass, and was shaped into a sheet. The obtained product was referred to as Rubber composition 2.

<Rubber Composition 3>

The same uncrosslinked rubber composition as Rubber composition 1 was prepared except that the content of the carbon black GPF was changed to 80 parts by mass, and the content of the carbon black FEF was changed to 10 parts by mass, and was shaped into a sheet. The obtained product was referred to as Rubber composition 3.

<Rubber Composition 4>

The same uncrosslinked rubber composition as Rubber composition 1 was prepared except that the content of the short aramid fiber was changed to 3 parts by mass, and was shaped into a sheet. The obtained product was referred to as Rubber composition 4.

<Rubber Composition 5>

The same uncrosslinked rubber composition as Rubber composition 1 was prepared except that the content of the carbon black GPF was changed to 10 parts by mass, and was shaped into a sheet. The obtained product was referred to as Rubber composition 5.

<Rubber Composition 6>

The same uncrosslinked rubber composition as Rubber composition 1 was prepared except that the carbon black GPF was not blended, and the content of the carbon black FEF was changed to 60 parts by mass, and was shaped into a sheet. The obtained product was referred to as Rubber composition 6.

<Rubber Composition 7>

The same uncrosslinked rubber composition as Rubber composition 1 was prepared except that 10 parts by mass of short cotton fiber was blended in place of the short aramid fiber, and was shaped into a sheet. The obtained product was referred to as Rubber composition 7.

<Rubber Composition 8>

The same uncrosslinked rubber composition as Rubber composition 1 was prepared except that 10 parts by mass of short polyamide fiber (manufactured by Asahi Kasei Corporation, trade name: Leona 66, length: 1 mm) was blended in place of the short aramid fiber, and was shaped into a sheet. The obtained product was referred to as Rubber composition 8.

<Rubber Composition 9>

The same uncrosslinked rubber composition as Rubber composition 1 was prepared except that the content of the short aramid fiber was changed to 15 parts by mass, and was shaped into a sheet. The obtained product was referred to as Rubber composition 9.

<Rubber Composition 10>

The same uncrosslinked rubber composition as Rubber composition 1 was prepared except that the content of the carbon black GPF was changed to 100 parts by mass, and was shaped into a sheet. The obtained product was referred to as Rubber composition 10.

<Rubber Composition 11>

In EPDM as the raw rubber, 60 parts by mass of the carbon black FEF, 5 parts by mass of zinc oxide, 0.5 parts by mass of the antioxidant (1), 2 parts by mass of the antioxidant (2), 12 parts by mass of the paraffinic oil, 2.5 parts by mass of the co-crosslinker, 10 parts by mass of dicumyl peroxide, and 4 parts by mass of the short cotton fiber, relative to 100 parts by mass of the raw rubber, were blended, and the blend was kneaded in an internal kneader for 5 minutes to obtain an uncrosslinked rubber composition. The uncrosslinked rubber composition was shaped into a sheet. This uncrosslinked rubber composition was referred to as Rubber composition 11.

<Rubber Composition 12>

In EPDM as the raw rubber, 60 parts by mass of the carbon black FEF, 5 parts by mass of zinc oxide, 0.5 parts by mass of the antioxidant (1), 2 parts by mass of the antioxidant (2), 10 parts by mass of the paraffinic oil, 1 part by mass of the co-crosslinker, 4 parts by mass of dicumyl peroxide, and 13 parts by mass of the short polyamide fiber, relative to 100 parts by mass of the raw rubber, were blended, and the blend was kneaded in an internal kneader for about 5 minutes to obtain an uncrosslinked rubber composition. The uncrosslinked rubber composition was shaped into a sheet. This uncrosslinked rubber composition was referred to as Rubber composition 12.

TABLE 1

| | Rubber composition | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| EPDM | 100 | 100 | 100 | 100 | 100 | 100 | 100 | 100 | 100 | 100 | 100 | 100 |
| Carbon black GPF | 60 | 60 | 80 | 60 | 10 | | 60 | 60 | 60 | 100 | | |
| Carbon black FEF | 10 | 10 | 5 | 10 | 10 | 60 | 10 | 10 | 10 | 10 | 60 | 60 |
| Zinc oxide | 5 | 5 | 5 | 5 | 5 | 5 | 5 | 5 | 5 | 5 | 5 | 5 |
| Antioxidant (1) | 0.5 | 0.5 | 0.5 | 0.5 | 0.5 | 0.5 | 0.5 | 0.5 | 0.5 | 0.5 | 0.5 | 0.5 |
| Antioxidant (2) | 2 | 2 | 2 | 2 | 2 | 2 | 2 | 2 | 2 | 2 | 2 | 2 |

TABLE 1-continued

| | Rubber composition | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Paraffinic oil | 10 | 10 | 10 | 10 | 10 | 10 | 10 | 10 | 10 | 10 | 12 | 10 |
| Co-crosslinker | 1 | 1 | 1 | 1 | 1 | 1 | 1 | 1 | 1 | 1 | 2.5 | 1 |
| Dicumyl peroxide | 4.5 | 4.5 | 4.5 | 4.5 | 4.5 | 4.5 | 4.5 | 4.5 | 4.5 | 4.5 | 10 | 4 |
| Short aramid fiber | 5 | 10 | 5 | 3 | 5 | 5 | | | 15 | 5 | | |
| Short cotton fiber | | | | | | | 10 | | | | 4 | |
| Short polyamide fiber | | | | | | | | 10 | | | | 13 |

Example 1

Two V-ribbed belts of Example 1 were formed by using Rubber composition 1 as an uncrosslinked rubber sheet constituting the compression rubber layer, and Rubber compositions 11 and 12 prepared as described above as uncrosslinked rubber sheets constituting the adhesion rubber layer and the back rubber layer, respectively. A polyester core wire was used as the core wire. Each of the V-ribbed belts had a width of 21.36 mm, a thickness of 4.3 mm, and a length of 1200 mm, and included 6 ribs of 2.0 mm in height arranged at a pitch of 3.56 mm.

Example 2

Two V-ribbed belts of Example 2 having the same structure as described in Example 1 were formed except that Rubber composition 2 was used as the uncrosslinked rubber sheet constituting the compression rubber layer.

Example 3

Two V-ribbed belts of Example 3 having the same structure as described in Example 1 were formed except that Rubber composition 3 was used as the uncrosslinked rubber sheet constituting the compression rubber layer.

Example 4

Two V-ribbed belts of Example 4 having the same structure as described in Example 1 were formed except that Rubber composition 4 was used as the uncrosslinked rubber sheet constituting the compression rubber layer.

Example 5

Two V-ribbed belts of Example 5 having the same structure as described in Example 1 were formed except that Rubber composition 5 was used as the uncrosslinked rubber sheet constituting the compression rubber layer.

Comparative Example 1

Two V-ribbed belts of Comparative Example 1 having the same structure as described in Example 1 were formed except that Rubber composition 6 was used as the uncrosslinked rubber sheet constituting the compression rubber layer.

Comparative Example 2

Two V-ribbed belts of Comparative Example 2 having the same structure as described in Example 1 were formed except that Rubber composition 7 was used as the uncrosslinked rubber sheet constituting the compression rubber layer.

Comparative Example 3

Two V-ribbed belts of Comparative Example 3 having the same structure as described in Example 1 were formed except that Rubber composition 8 was used as the uncrosslinked rubber sheet constituting the compression rubber layer.

Comparative Example 4

Two V-ribbed belts of Comparative Example 4 having the same structure as described in Example 1 were formed except that Rubber composition 9 was used as the uncrosslinked rubber sheet constituting the compression rubber layer.

Comparative Example 5

Two V-ribbed belts of Comparative Example 5 having the same structure as described in Example 1 were formed except that Rubber composition 10 was used as the uncrosslinked rubber sheet constituting the compression rubber layer.

TABLE 2

| | Example 1 | Example 2 | Example 3 | Example 4 | Example 5 |
|---|---|---|---|---|---|
| Compression rubber layer | Rubber composition 1 | Rubber composition 2 | Rubber composition 3 | Rubber composition 4 | Rubber composition 5 |
| Adhesion rubber layer | Rubber composition 11 | Rubber composition 11 | Rubber composition 11 | Rubber composition 11 | Rubber composition 11 |
| Back rubber layer | Rubber composition 12 | Rubber composition 12 | Rubber composition 12 | Rubber composition 12 | Rubber composition 12 |
| | Comparative Example 1 | Comparative Example 2 | Comparative Example 3 | Comparative Example 4 | Comparative Example 5 |
| Compression rubber layer | Rubber composition 6 | Rubber composition 7 | Rubber composition 8 | Rubber composition 9 | Rubber composition 10 |

TABLE 2-continued

| Adhesion rubber layer | Rubber composition 11 | Rubber composition 11 | Rubber composition 11 | Rubber composition 11 | Rubber composition 11 |
|---|---|---|---|---|---|
| Back rubber layer | Rubber composition 12 | Rubber composition 12 | Rubber composition 12 | Rubber composition 12 | Rubber composition 12 |

(Evaluation Test Method)

<First Noise Test on Wet Belt>

Figure 4:
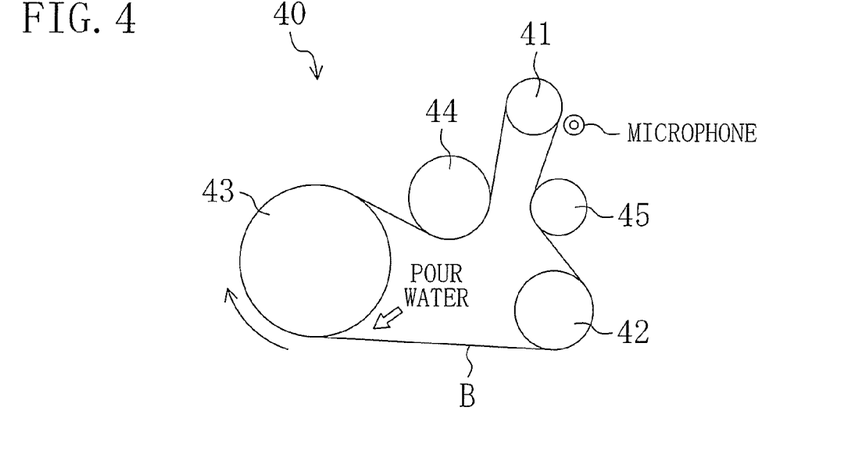
FIG. 4 shows a layout of pulleys of a belt running tester used for a first noise test on a wet belt.

FIG. 4 shows a layout of pulleys of a belt running tester 40 used for a first noise test on a wet belt.

The belt running tester 40 included a small-diameter first ribbed driven pulley 41 (60 mm in diameter) provided at the topmost position, a second ribbed driven pulley 42 (75 mm in diameter) provided substantially below the first ribbed driven pulley 41, a large-diameter ribbed drive pulley 43 (140 mm in diameter) provided at a lower left position relative to the first driven pulley 41, and on the left of the second driven pulley 42, a first idler pulley 44 (75 mm in diameter) provided in the middle of the first ribbed driven pulley 41 and the ribbed drive pulley 43, and a small-diameter second idler pulley 45 (55 mm in diameter) provided in the middle of the first ribbed driven pulley 41 and the second driven pulley 42, and on the right of the first idler pulley 44. The first idler pulley 44 was positioned outside the belt loop to form a wrap angle of 90 degrees. The second idler pulley 45 was positioned outside the belt loop to form a wrap angle of 60 degrees. The second ribbed driven pulley 42 and the ribbed drive pulley 43 were provided to extend the V-ribbed belt B horizontally between the pulleys 42 and 43. The first ribbed driven pulley 41 was an alternator pulley (an ALT pulley) for an automobile. A microphone was arranged on the right of the first ribbed driven pulley 41 at a distance of 50 mm from the first ribbed driven pulley 41, and was connected to a detector.

Each of ten V-ribbed belts of Examples 1-5 and Comparative Examples 1-5 was sequentially wrapped around the first driven pulley 41, the first idler pulley 44, the ribbed drive pulley 43, the second ribbed driven pulley 42, and the second idler pulley 45. A tension of 5 kgf per rib, i.e., a tension of 30 kgf for the whole belt, was applied to the belt, a large current load (60A) was applied to the first ribbed driven pulley 41, and the ribbed drive pulley 43 was rotated clockwise at 800 rpm in an atmospheric temperature of 25° C. While the V-ribbed belt was running, water was poured onto part of the V-ribbed belt which was about to be wrapped around the ribbed drive pulley 43 at the rate of 1000 ml/min, and a level of generated noise was evaluated from sound detected by the detector. The level of noise was evaluated as "A" when the noise was not generated at all, "B" when the noise was slightly generated, or "C" when the noise was generated.

<Second Noise Test on Wet Belt>

Figure 5:
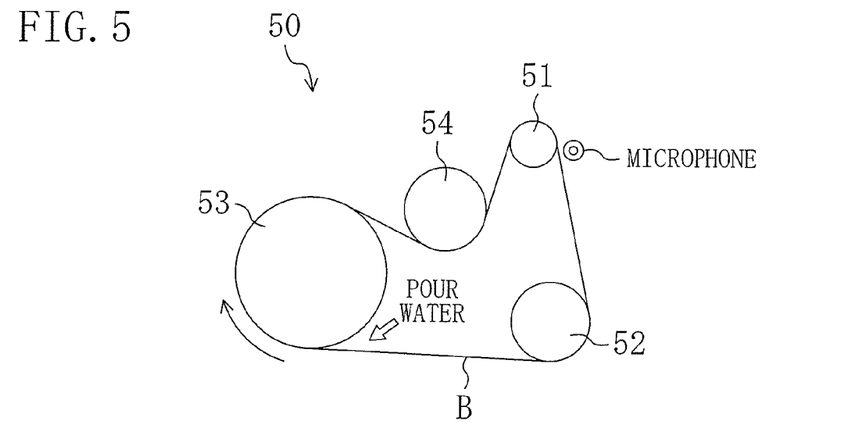
FIG. 5 shows a layout of pulleys of a belt running tester used for a second noise test on a wet belt.

FIG. 5 shows a layout of pulleys of a belt running tester 50 used for a second noise test on a wet belt.

The belt running tester 50 included a small-diameter first ribbed driven pulley 51 (50 mm in diameter) provided at the topmost position, a second ribbed driven pulley 52 (75 mm in diameter) provided substantially below the first ribbed driven pulley 51, a large-diameter ribbed drive pulley 53 (140 mm in diameter) provided at a lower left position relative to the first driven pulley 51, and on the left of the second driven pulley 52, and an idler pulley 54 (75 mm in diameter) provided in the middle of the first ribbed driven pulley 51 and the ribbed drive pulley 53. The idler pulley 54 was positioned outside the belt loop to form a wrap angle of 115 degrees. The second ribbed driven pulley 52 and the ribbed drive pulley 53 were provided to extend the V-ribbed belt B horizontally between the pulleys 52 and 53. The first ribbed driven pulley 51 was an alternator pulley (an ALT pulley) for an automobile. A microphone was arranged on the right of the first ribbed driven pulley 51 at a distance of 50 mm from the first ribbed driven pulley 51, and was connected to a detector.

Each of ten V-ribbed belts of Examples 1-5 and Comparative Examples 1-5 which were not used for the first noise test on the wet belt was sequentially wrapped around the first driven pulley 51, the idler pulley 54, the ribbed drive pulley 53, and the second ribbed driven pulley 52. A tension of 5 kgf per rib, i.e., a tension of 30 kgf for the whole belt, was applied to the belt, a large current load (60A) was applied to the first ribbed driven pulley 51, and the ribbed drive pulley 53 was rotated clockwise at 800 rpm in an atmospheric temperature of 25° C. While the V-ribbed belt was running, water was poured onto part of the V-ribbed belt which was about to be wrapped around the ribbed drive pulley 53 at the rate of 1000 ml/min, and a level of generated noise was evaluated from sound detected by the detector. The level of noise was evaluated as "A" when the noise was not generated at all, "B" when the noise was slightly generated, or "C" when the noise was generated.

<Heat Resistance Test on Running Belt>

Figure 6:
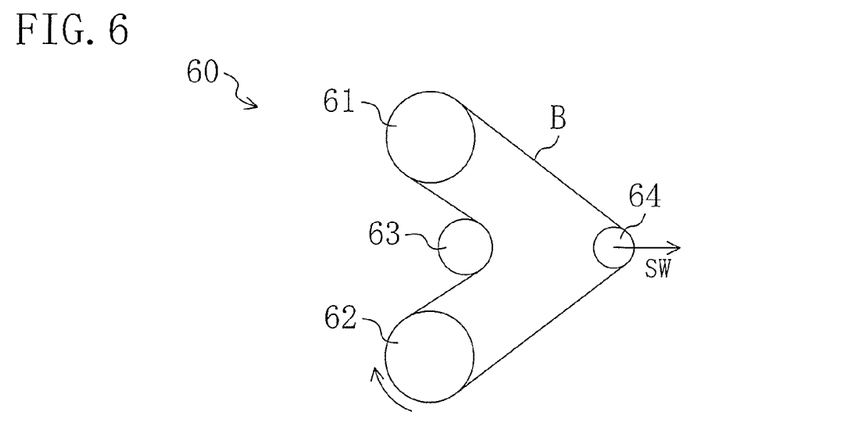
FIG. 6 shows a layout of pulleys of a belt running tester used for a heat resistance test on a running belt.

FIG. 6 shows a layout of pulleys of a belt running tester 60 used for a test of heat resistance on the running belt.

The belt running tester 60 included a large-diameter ribbed driven pulley 61 (120 mm in diameter) and a large-diameter ribbed drive pulley 62 (120 mm in diameter) which were vertically aligned with each other, and an idler pulley 63 (70 mm in diameter) provided in the middle of the vertically aligned driven pulley 61 and drive pulley 62, and slightly on the right of the pulleys 61 and 62, and a small-diameter ribbed driven pulley 64 (55 mm in diameter) provided on the right of the idler pulley 63. The idler pulley 63 was positioned outside the belt loop to form a wrap angle of 90 degrees. The small-diameter ribbed pulley 64 was positioned inside the belt loop to form a wrap angle of 90 degrees.

After the first noise test on the wet belt or the second noise test on the wet belt was performed on 20 V-ribbed belts of Examples 1-5 and Comparative Examples 1-5, the belts were removed from the belt running tester 40 and the belt running tester 50, and each of the belts was wrapped around the three ribbed pulleys 61, 62, and 64, and the idler pulley 63. The small-diameter ribbed pulley 64 was pulled in the lateral direction to apply a set weight of 85 kgf, and the lower ribbed drive pulley 62 was rotated clockwise at 4900 rpm in an atmospheric temperature of 120° C. Time passed until a crack generated in the ribbed surface of the V-ribbed belt reached the core wire was measured. The time was referred to as heat resistance time of the running belt.

(Results of Evaluation Test)
Table 3 shows the results of the evaluation.

TABLE 3

| | Example | | | | | | | | | |
|---|---|---|---|---|---|---|---|---|---|---|
| | 1 | | 2 | | 3 | | 4 | | 5 | |
| 1st test: noise level (pulley diameter: 60 mm) | A | — | A | — | A | — | A | — | A | — |
| 2nd test: noise level (pulley diameter: 50 mm) | — | A | — | A | — | A | — | B | — | B |
| Heat resistance time of running belt (h) | 595 | 603 | 605 | 612 | 592 | 601 | 620 | 618 | 615 | 625 |

| | Comparative Example | | | | | | | | | |
|---|---|---|---|---|---|---|---|---|---|---|
| | 1 | | 2 | | 3 | | 4 | | 5 | |
| 1st test: noise level (pulley diameter: 60 mm) | B | — | B | — | A | — | A | — | A | — |
| 2nd test: noise level (pulley diameter: 50 mm) | — | C | — | C | — | C | — | A | — | A |
| Heat resistance time of running belt (h) | 592 | 596 | 575 | 586 | 596 | 605 | 335 | 350 | 292 | 303 |

Table 3 shows that Example 1 in which the carbon black having an iodine adsorption number of 40 mg/g or lower was blended in the rubber composition constituting the compression rubber layer advantageously prevented the noise generation of the wet belt as compared with Comparative Example 1 in which the carbon black having an iodine adsorption number higher than 40 mg/g was blended. In particular, Example 1 was significantly advantageous when the belt was wrapped around the pulley having a diameter of 50 mm.

Example 2 in which the short aramid fiber was blended in the rubber composition constituting the compression rubber layer advantageously prevented the noise generation of the wet belt when the belt was wrapped around the pulley having a diameter of 50 mm as compared with Comparative Example 2 and Comparative Example 3 in which the short fiber except for the short aramid fiber was blended.

Examples 1, 2, and 4 in which 3-10 parts by mass of the short aramid fiber was blended in the rubber composition constituting the compression rubber layer showed considerably long heat resistance time of the running belt as compared with Comparative Example 4 in which 15 parts by mass of the short aramid fiber was blended.

Examples 1, 3, and 5 in which 10-80 parts by mass of the carbon black GPF was blended in the rubber composition constituting the compression rubber layer showed considerably long heat resistance time of the running belt as compared with Comparative Example 5 in which 100 parts by mass of the carbon black GPF was blended.

INDUSTRIAL APPLICABILITY

As described above, the present invention is useful for a friction drive belt, and a belt transmission system using the same.

DESCRIPTION OF REFERENCE CHARACTERS

B V-ribbed belt (friction drive belt)
13 V-shaped rib (pulley contacting portion)
14 Short aramid fiber

The invention claimed is:
1. A friction drive belt comprising:
a pulley contacting portion which is made of a rubber composition of an ethylene-α-olefin elastomer as raw rubber in which 40-80 parts by mass of carbon black GPF having an iodine adsorption number of 40 mg/g or lower relative to 100 parts by mass of the raw rubber, 5-10 parts of carbon black FEF having an iodine adsorption number larger than 40 mg/g relative to 100 parts by mass of the raw rubber, and 5-10 parts by mass of short aramid fiber relative to 100 parts by mass of the raw rubber are blended,
wherein the ethylene-α-olefin elastomer is crosslinked by an organic peroxide blended in the ethylene-α-olefin elastomer.
2. A belt transmission system comprising:
a friction drive belt including a pulley contacting portion which is made of a rubber composition of an ethylene-α-olefin elastomer as raw rubber in which 40-80 parts by mass of carbon black GPF having an iodine adsorption number of 40 mg/g or lower relative to 100 parts by mass of the raw rubber, 5-10 parts of carbon black FEF having an iodine adsorption number larger than 40 mg/g relative to 100 parts by mass of the raw rubber, and 5-10 parts by mass of short aramid fiber relative to 100 parts by mass of the raw rubber are blended, wherein
the ethylene-α-olefin elastomer is crosslinked by an organic peroxide blended in the ethylene-α-olefin elastomer, and
the friction drive belt is wrapped around a plurality of pulleys including a pulley having a diameter of 70 mm or smaller.

* * * * *